(12) United States Patent
Chakraborty et al.

(10) Patent No.: US 7,587,215 B2
(45) Date of Patent: Sep. 8, 2009

(54) USER INTERFACE FOR CELLULAR TELEPHONE GROUP CALLS

(75) Inventors: Sumanta Chakraborty, San Diego, CA (US); Jibu Joseph, San Diego, CA (US); Utpal Das, Noida (IN); Harpreet Singh, New Delhi (IN)

(73) Assignee: Siemens Aktiengesellschaft, Munich (DE)

( * ) Notice: Subject to any disclaimer, the term of this patent is extended or adjusted under 35 U.S.C. 154(b) by 612 days.

(21) Appl. No.: 10/888,728

(22) Filed: Jul. 9, 2004

(65) Prior Publication Data

US 2005/0176454 A1    Aug. 11, 2005

Related U.S. Application Data

(60) Provisional application No. 60/543,306, filed on Feb. 9, 2004.

(51) Int. Cl.
 *H04B 7/00* (2006.01)
(52) U.S. Cl. .................. 455/518; 455/41.2; 345/329; 715/758
(58) Field of Classification Search .................. 455/518
See application file for complete search history.

(56) References Cited

U.S. PATENT DOCUMENTS

| | | | |
|---|---|---|---|
| 4,653,090 A | 3/1987 | Hayden | |
| 5,630,081 A | 5/1997 | Rybicki et al. | |
| 5,737,685 A | 4/1998 | Locascio et al. | |
| 5,793,365 A * | 8/1998 | Tang et al. | 715/758 |
| 5,848,356 A | 12/1998 | Jambhekar et al. | |
| 5,886,697 A | 3/1999 | Naughton et al. | |
| 6,018,711 A | 1/2000 | French-St. George et al. | |
| 6,154,209 A | 11/2000 | Naughton et al. | |
| 6,226,367 B1 | 5/2001 | Smith et al. | |
| 6,278,454 B1 | 8/2001 | Krishnan | |
| 6,344,861 B1 | 2/2002 | Naughton et al. | |
| 6,393,307 B1 | 5/2002 | Kim | |
| 6,408,179 B1 | 6/2002 | Stosz et al. | |
| 6,591,111 B1 | 7/2003 | Stosz et al. | |
| 2003/0040340 A1 | 2/2003 | Smethers | |
| 2003/0119540 A1 | 6/2003 | Mathis | |
| 2003/0210265 A1 | 11/2003 | Haimberg | |

(Continued)

FOREIGN PATENT DOCUMENTS

DE    10224905 A1    2/2003

(Continued)

OTHER PUBLICATIONS

Ben Shneiderman, "Designing the User Interface: Strategies for Effective Human-Computer Interaction-Third Edition", Mar. 1998, pp. 488-490.

*Primary Examiner*—Yuwen Pan
*Assistant Examiner*—Ajibola Akinyemi

(57) ABSTRACT

In connection with a push-to-talk-over-cellular (PoC) function of a cellular telephone, the user interface of the cellular telephone presents certain information to the user of the cellular telephone concerning a current group call session. The information may include an indication of what proportion of the members of a group designated for the group call session are currently active. In addition, the user interface may provide a list of the members of the designated group, with icons indicating the current status of the group members. When a member of the group is currently talking, the talking member's name may be displayed by the user interface.

10 Claims, 6 Drawing Sheets

U.S. PATENT DOCUMENTS

| | | |
|---|---|---|
| 2003/0233650 A1 | 12/2003 | Zaner et al. |
| 2004/0202117 A1 | 10/2004 | Wilson et al. |
| 2005/0124365 A1* | 6/2005 | Balasuriya et al. .......... 455/518 |
| 2006/0128411 A1* | 6/2006 | Turcanu ..................... 455/518 |
| 2008/0026702 A1 | 1/2008 | Chakraborty et al. |
| 2008/0026703 A1 | 1/2008 | Chakraborty et al. |

FOREIGN PATENT DOCUMENTS

| | | |
|---|---|---|
| EP | 1168796 A1 | 1/2002 |
| WO | WO 00/30375 A2 | 5/2000 |
| WO | WO 02/089501 A1 | 11/2002 |

* cited by examiner

USER INTERFACE FOR CELLULAR TELEPHONE GROUP CALLS

CROSS-REFERENCE TO RELATED APPLICATION

This application claims priority under 35 U.S.C. § 119 to U.S. Provisional Patent Application Ser. No. 60/543,306, entitled "User Interface for Push-To-Talk Calls on Cellular Phones", filed in the name of Chakraborty et al. on Feb. 9, 2004, the contents of which are hereby incorporated by reference in their entirety for all purposes.

BACKGROUND

The present disclosure relates generally to cellular telephones, and more particularly to a user interface for push-to-talk group calls on a cellular telephone.

Cellular telephones are in widespread use. Various services are available over cellular telephones, including so-called group calls provided via a push-to-talk-over-cellular (PoC) procedure. In such group calls, more than two parties may participate in a call session, although only one party is able to speak (transmit) at any given time.

One particular challenge facing designers of cellular telephones is provision of a satisfactory user interface for the various types of services available over cellular telephones. Part of the difficulty in providing a suitable user interface stems from the small size of the display that is included in most cellular telephones.

One area of cellular telephone design in which improvement would be especially desirable relates to the user interface provided for PoC group calls.

SUMMARY

Apparatus and methods are therefore presented for an improved cellular telephone.

According to some embodiments, a method of operating a cellular telephone is provided. The cellular telephone is operated by a first user and includes a display. The cellular telephone is selectively operable in a mode in which a group call is supported among more than two parties according to a push-to-talk-over-cellular (PoC) procedure. The cellular telephone includes a designation of a group of cellular telephone users other than the first user. The method includes entering into a group call session in accordance with the PoC procedure. The designated group is selected for the group call session. The method further includes displaying on the display information that indicates how many members of the designated group are in an active status relative to the group call session.

According to some embodiments, a method of operating a cellular telephone is provided. The cellular telephone is operated by a first user and includes a display. The cellular telephone is selectively operable in a mode in which a group call is supported among more than two parties according to a push-to-talk-over-cellular (PoC) procedure. The cellular telephone includes a designation of a group of cellular telephone users other than the first user. The method includes entering into a group call session in accordance with the PoC procedure. The designated group is selected for the group call session. The method further includes displaying on the display, during the group call session, a listing of a respective name of each of at least some of the members of the group of cellular phone users.

According to some embodiments, a method of operating a cellular telephone is provided. The cellular telephone is operated by a first user and includes a display. The cellular telephone is selectively operable in a mode in which a group call is supported among more than two parties according to a push-to-talk-over-cellular (PoC) procedure. The cellular telephone includes a designation of a group of cellular telephone users other than the first user. The method includes entering into a group call session in accordance with the PoC procedure. The designated group is selected for the group call session. The method further includes displaying on the display a name of a member of the designated group who is currently transmitting in the group call session.

According to some embodiments, a cellular telephone includes a processor and a communication mechanism which is operatively coupled to the processor for receiving and transmitting information. The cellular telephone also includes a display component operatively coupled to the processor, and a memory that is operatively coupled to the processor. The memory stores software adapted to control the processor to store in the memory a designation of a group of users of other cellular telephones and to place the cellular telephone in a mode in which a group call is supported among more than two parties according to a push-to-talk-over-cellular (PoC) procedure. The software stored in the memory further controls the processor to enter into a group call session in accordance with the PoC procedure. The designated group is selected for the group call session. The software in the memory further controls the processor to display on the display component information that indicates how many members of the designated group are in an active status relative to the group call session.

According to some embodiments, a cellular telephone includes a processor and a communication mechanism which is operatively coupled to the processor for receiving and transmitting information. The cellular telephone also includes a display component operatively coupled to the processor, and a memory that is operatively coupled to the processor. The memory stores software adapted to control the processor to store in the memory a designation of a group of users of other cellular telephones and to place the cellular telephone in a mode in which a group call is supported among more than two parties according to a push-to-talk-over-cellular (PoC) procedure. The software stored in the memory further controls the processor to enter into a group call session in accordance with the PoC procedure. The designated group is selected for the group call session. The software in the memory further controls the processor to display on the display component, during the group call session, a listing of a respective name of each of at least some of the members of the group of cellular phone users.

According to some embodiments, a cellular telephone includes a processor and a communication mechanism which is operatively coupled to the processor for receiving and transmitting information. The cellular telephone also includes a display component operatively coupled to the processor, and a memory that is operatively coupled to the processor. The memory stores software adapted to control the processor to store in the memory a designation of a group of users of other cellular telephones and to place the cellular telephone in a mode in which a group call is supported among more than two parties according to a push-to-talk-over-cellular (PoC) procedure. The software stored in the memory further controls the processor to enter into a group call session in accordance with the PoC procedure. The designated group is selected for the group call session. The software in the memory further controls the processor to display on the display component a name of a member of the designated group who is currently transmitting in the group call session.

Further aspects of the instant cellular telephone will be more readily appreciated upon review of the detailed description of the preferred embodiments included below when taken in conjunction with the accompanying drawings.

DETAILED DESCRIPTION

According to some embodiments, a cellular telephone provides an improved user interface for PoC group calls. For example, the cellular telephone may display the proportion of group members that are currently in an active status for a group call. In addition, or alternatively, a roster of group members may be listed with icons to indicate the current status of the group members (e.g., listening, speaking, ringing, not active) with respect to the group call. In addition, or alternatively, when a group member (not the user of the cellular telephone) is speaking, the cellular telephone may display the name of the speaking group member.

Some or all of these features may improve the user's ability to use and follow progress of a PoC group call provided via the cellular telephone.

Figure 1:
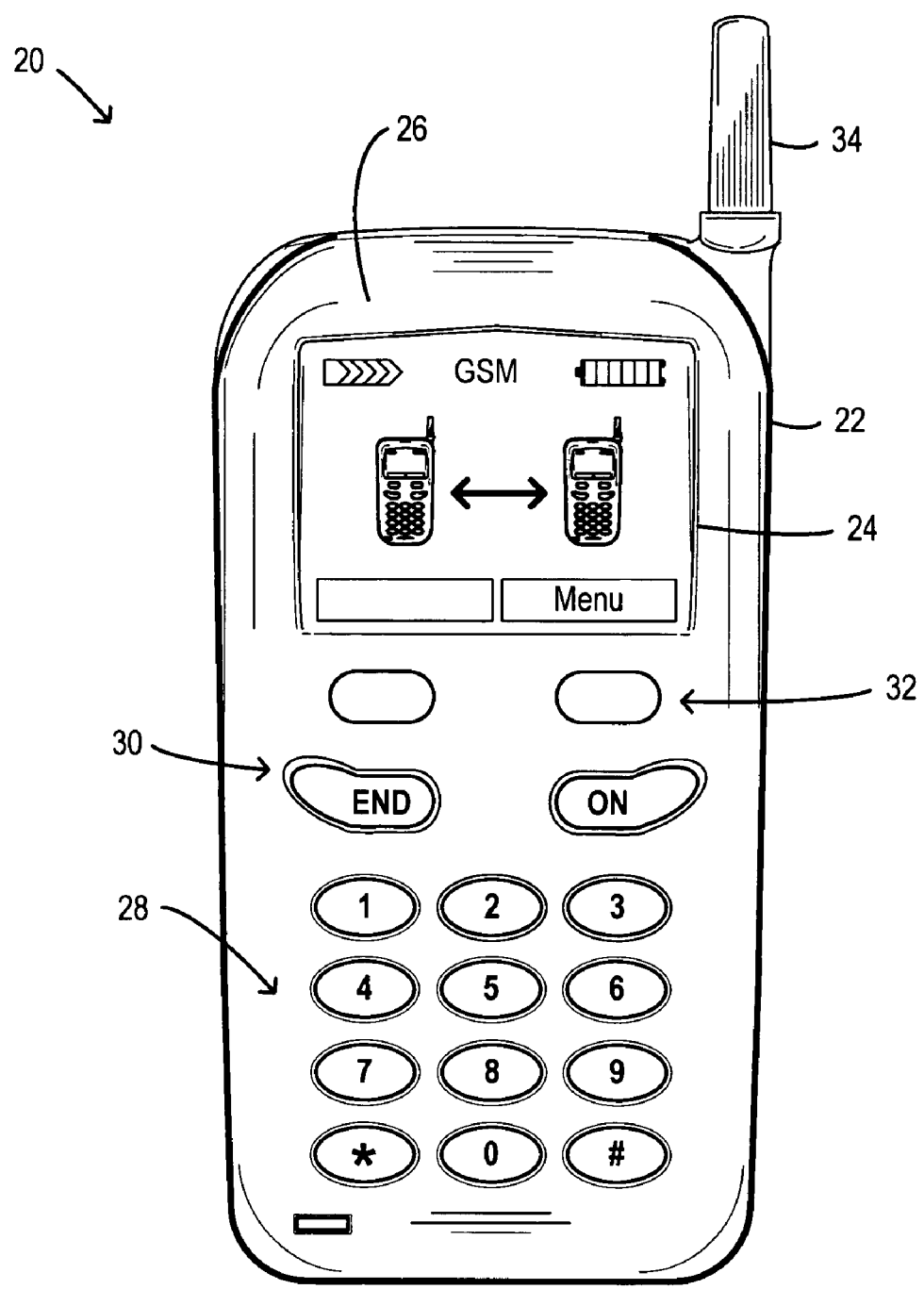
FIG. 1 is a schematic front elevation view of a cellular telephone provided in accordance with some aspects of the invention.

FIG. 1 is a schematic front elevation view of a cellular telephone 20 provided in accordance with some aspects of the invention. The cellular telephone 20 may be completely or largely conventional in terms of its physical components, and may be programmed to perform certain functions (e.g., to display certain information to a user) in accordance with aspects of the present invention.

The cellular telephone 20 includes a housing 22, which may be shaped and sized to fit in a user's hand. Other components of the cellular telephone 20, which are described below, are mounted on or within the housing 22.

The cellular telephone 20 also includes a display component 24 (sometimes referred to simply as a "display"), which is mounted on the front 26 of the housing 22. Also included in the cellular telephone 20, and mounted on the front 26 of the housing 22, is a numeric keypad 28 which may be laid out, as shown, like a conventional telephone dialing keypad. In addition, the cellular telephone 20 may include certain fixed function keys 30, also mounted on the front 26 of the housing 22. Further, the cellular telephone 20 includes so-called "soft" function keys 32 mounted on the front 26 of the housing 22 just below the display component 24. As is well known, the functions provided by the soft keys 32 vary in accordance with function labels displayed on the display component 24 in locations just above the soft keys 32. The front of the housing 22 may have other function keys and the like (which are not shown, so as to simplify the drawing).

An antenna 34 extends from the top of the housing 22. It will be appreciated that the cellular telephone also includes a microphone and a speaker, which are referred to below but are not shown in FIG. 1 in order to simplify the drawing.

Figure 2:
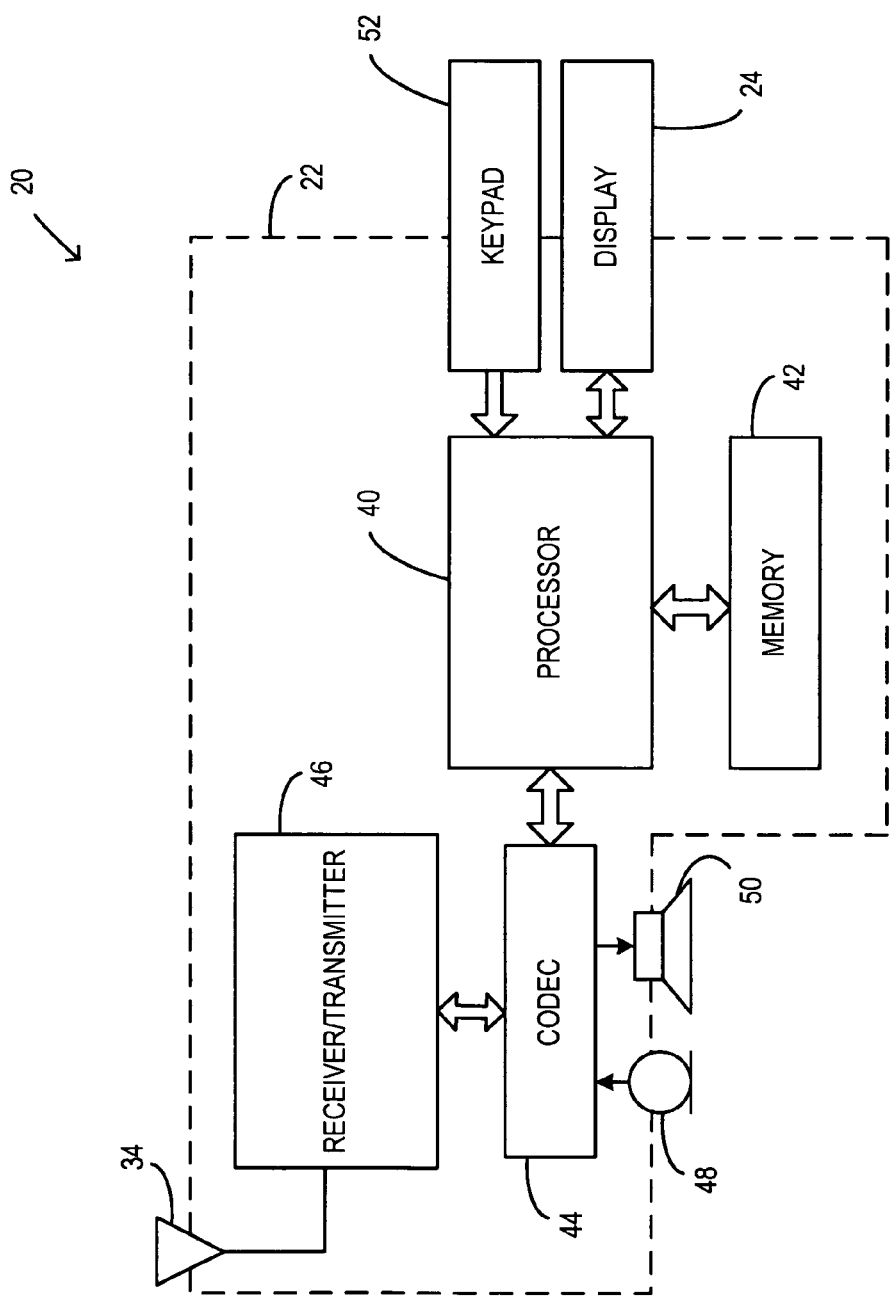
FIG. 2 is a simplified block diagram representation of the cellular telephone of FIG. 1.

FIG. 2 is a simplified block diagram representation of the cellular telephone 20.

As seen from FIG. 2, the cellular telephone 20 also includes a processor 40, which may be a conventional microprocessor, microcontroller and/or digital signal processor (DSP) or other control circuit conventionally provided in a cellular telephone. Also included in the cellular telephone 20 are memory components 42, which may include one or more of ROM (read only memory), RAM (random access memory, e.g., static RAM), and flash memory. The processor 40 is in data communication with the memory components 42. The memory components 42 may store software programs that control operation of the processor 40. Some of the software may be conventional. Other portions of the software may be provided in accordance with the present invention to cause the processor 40 to perform functions that are described below.

A conventional codec (coder/decoder) 44 is also included in the cellular telephone 20 and is in data communication with the processor 40. A conventional receiver/transmitter 46 is operatively coupled to the codec 44 and is also operatively coupled to the antenna 34. The receiver/transmitter 46 may, in accordance with conventional practices, comprise a combination of two or more different receive/transmit modules (not separately shown) that operate in accordance with mutually different radio communication protocols to provide various services for the cellular telephone 20. For example, the receiver transmitter 46 may operate in accordance with one radio communication protocol to provide conventional two-way service for the cellular telephone 20, and may operate in accordance with another radio communication protocol to provide PoC service for the cellular telephone 20.

A conventional microphone 48 is operatively coupled to the codec 44 to provide voice input signals to the codec 44. A conventional speaker 50 is also operatively coupled to the codec 44 and is driven by the codec 44 to provide audible output.

The user interface of the cellular telephone 20, which has been partially described above, includes the above-mentioned keys 28, 30, 32, all of which are represented by block 52 in FIG. 2. The keys 52 are operatively coupled to the processor 40, as is the display component 24, which also constitutes a portion of the user interface of the cellular telephone. In some embodiments, the display component 24 may be a touch screen capable of both outputting information to the user under the control of the processor 40 and receiving manual input from the user for the processor 40. In other embodiments, the display component 24 is not a touch screen and therefore only outputs information to the user. In such cases, all user inputs may be provided to the processor 40 via the keys 52 and/or via other keys or buttons which are not separately shown.

It will be understood that the block diagram representation in FIG. 2 of the cellular telephone 20 is simplified in a number of ways. For example, all power, and power management components of the cellular telephone 20 are omitted from the drawing.

Figure 3:
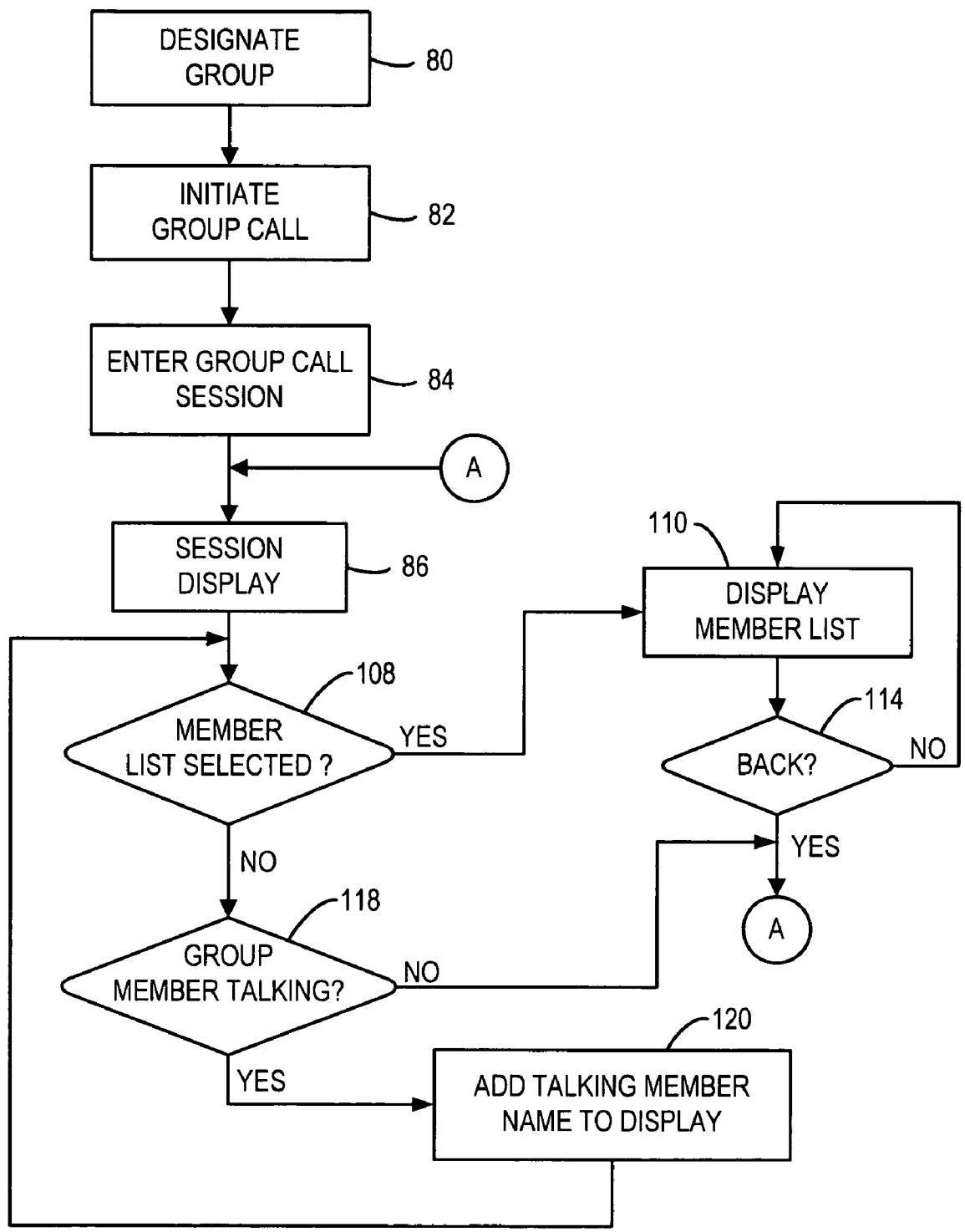
FIG. 3 is a flow chart that illustrates a process performed by the cellular telephone of FIGS. 1 and 2 in accordance with some aspects of the invention.

FIG. 3 is a flow chart that illustrates a process performed by the cellular telephone 20 in accordance with some aspects of the invention. The process illustrated in FIG. 3 relates to placement of a PoC group call via the cellular telephone 20 and may represent only a fraction of the total functionality of the cellular telephone 20. The process of FIG. 3 may be implemented by a software program stored in one or more of the memory components 42 to control the processor 40.

As indicated at 80 in FIG. 3, a selection is made of a group to which a PoC group call is to be directed. For example, the user of the cellular telephone 20 may select a group by selecting a group name or other group identifiers from a list of groups that the user has previously designated. Alternatively, the group selected for the group call may be designated on an ad hoc basis by selecting names (also referred to as "identifiers") of individual prospective group members from a list of names of users of other cellular telephones. It will be understood that the list of names may have been stored previously in the cellular telephone 20. The selected group, whether previously designated or designated on an ad hoc basis, may be considered to be designated for the group call by the selection which occurs at 80, and the designated group may be stored in the memory 42.

Next, as indicated at 82, the user may operate the cellular telephone to initiate a group call to the designated group. Then, upon placement of the group call, the cellular telephone enters into a group call session (as indicated at 84), and displays, via the display component 24, one or more session displays, as indicated at 86.

Figure 4:
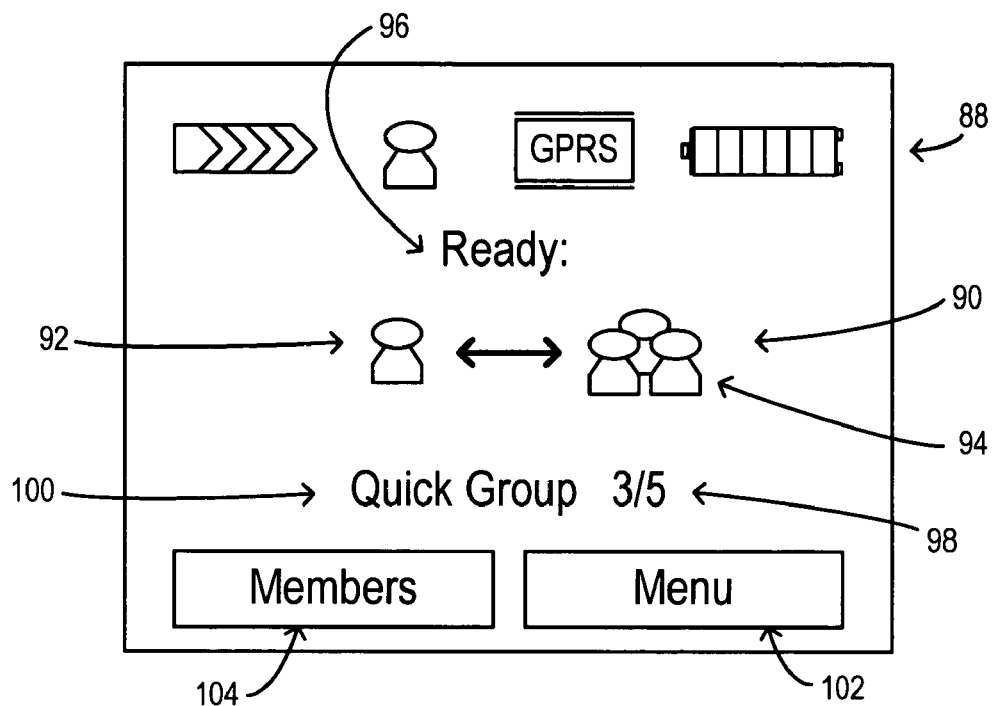
FIGS. 4-6 are example screen displays provided by the cellular telephone of FIGS. 1 and 2 in accordance with some aspects of the invention.

FIG. 4 shows an example screen display that is displayed by the display component 24 of the cellular telephone 20 at the time of a group call session, and in particular when the group call session is "waiting" with no party talking. The screen display of FIG. 4 includes, at an upper portion, icons 88, which may be indicative, for example, of the strength of the signal received by the cellular telephone, the remaining charge on the battery of the cellular telephone, and the type of radio communication protocol being utilized (e.g., a protocol appropriate for PoC).

The screen display of FIG. 4 also includes a group of icons 90 at a central portion. The group of icons 90 includes a solitary figure icon 92, representing the user of the cellular telephone 20, and a cluster 94 of figure icons, representing collectively the designated group for the group call. Thus the icons 90 together indicate to the user of the cellular telephone 20 the "one-to-many" nature of the group call, in contrast to the one-to-one nature of a PoC call that is not a group call. The waiting status of the group call is indicated by the legend "Ready" at 96 above the icons 90.

The screen display of FIG. 4 also has an indication 98 to indicate what proportion of the members of the group designated for the group call session are in an active status relative to the group call session. In this particular example, the indication 98 includes a first numeral "3", followed in space on the display component (not separately shown in FIG. 4) by the symbol "/", followed in space on the display component by a second numeral "5". This indication 98 may be interpreted to mean that three out of five members of the designated group are in an active status relative to the group call session.

The screen display of FIG. 4 also has a legend 100 which may be a name that identifies the designated group (if it is a pre-designated group), or which may indicate that the designated group is an ad hoc group selected and designated just for the current group call. For example, the legend "Quick Group" shown in FIG. 4 may indicate that the designated group is an ad hoc group.

The screen display of FIG. 4 also shows function labels 102, 104 which respectively indicate the current functions defined for the two soft keys 32 (FIG. 1, not shown in FIG. 4). For example, the right-hand function label 102 may indicate that a menu function is accessible by actuating the right-hand one of the soft keys, and the left-hand function label 104 may indicate that a member list function (to be described below) is accessible by actuating the left-hand one of the soft keys.

Figure 5:
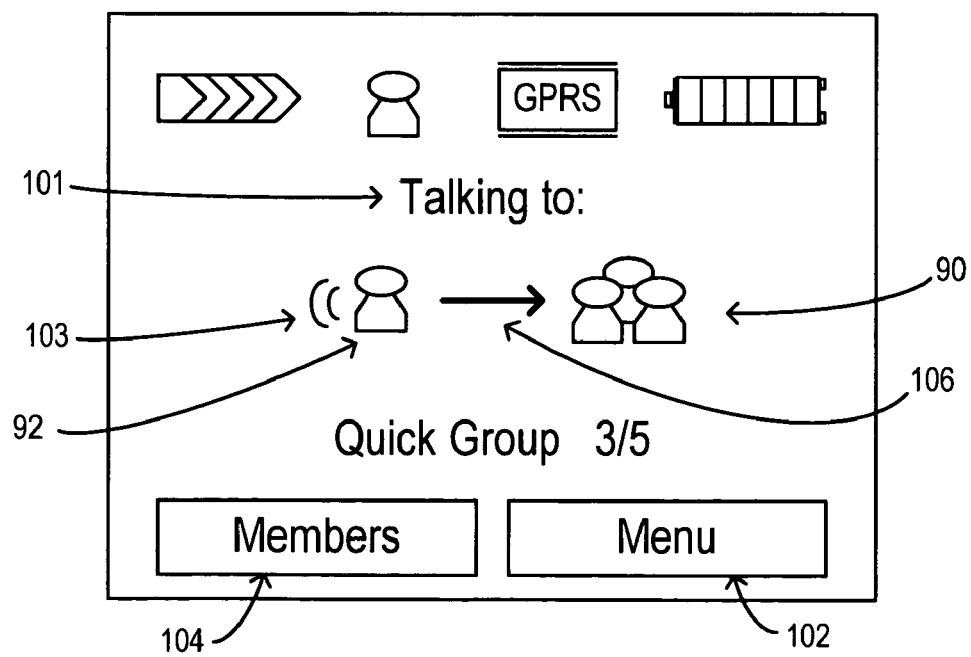

FIG. 5 shows another example screen display that may be presented by the cellular telephone 20 during a group call session, and in particular at a time when the cellular telephone 20 is transmitting to the designated group (i.e., the user of the cellular telephone 20 is talking). The screen display of FIG. 5 may be like the screen display of FIG. 4 with the following exceptions:

(1) The "Ready" legend 96 of FIG. 4 is replaced by the legend 101 in FIG. 5 that reads "Talking to"; and (2) The group of icons 90, as presented in the screen display of FIG. 5, includes icons 103 and 106, and has the solitary icon 92 highlighted, all to indicate that the cellular telephone 20 is transmitting.

It will be noted that the screen display of FIG. 5 includes the same indication 98 as the screen display of FIG. 4.

Referring again to FIG. 3, a determination may be made at 108 as to whether the user has selected the member list function. As noted before, the member list function may be selectable by actuating the left-hand soft key labeled by the function label 104 shown in FIGS. 4 and 5. If a positive determination is made at 108 (i.e., if the member list function has been selected), then the member list is displayed, as indicated at 110 in FIG. 3.

Figure 6:
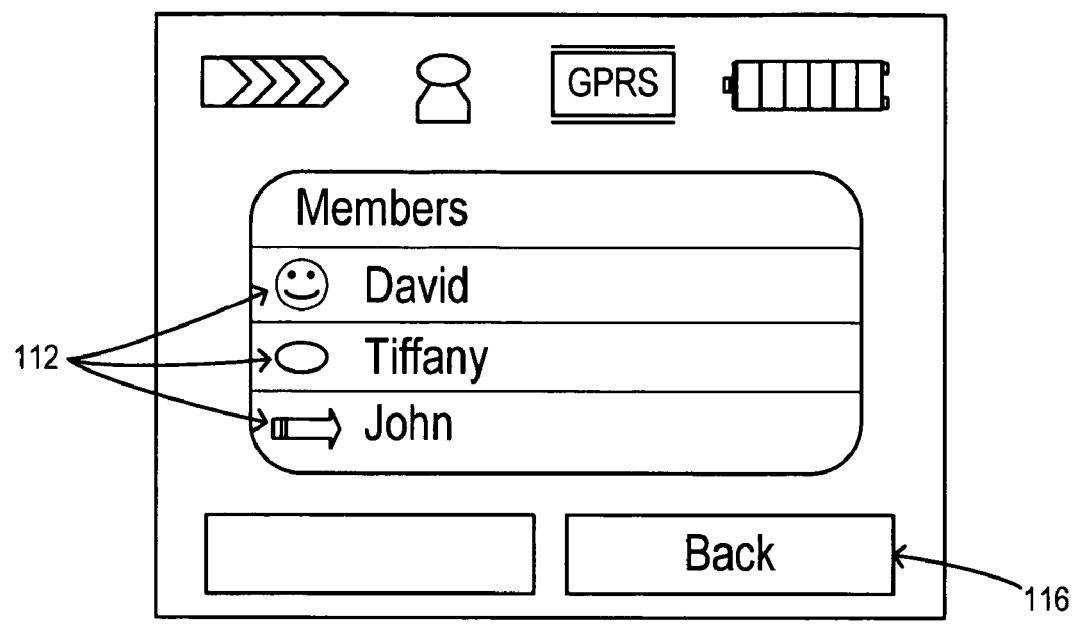

FIG. 6 is an example screen display which presents the member list. The member list contains respective names of the members of the group designated for the current group call session. Due to the limited size of the display component 24 (FIG. 1), it may be necessary for the user to scroll through the member list in order to view the names of all of the members of the designated group. It will be noted that the second numeral ("5" in the example shown in FIGS. 4 and 5) of the indication 98 indicates to the user the total number of members of the designated group. Although not shown in the drawings, the keys on the front of the cellular telephone may include a conventional scroll key that the user may actuate to scroll through the member list. (The scroll key may also be usable to scroll through menus and the like presented in accordance with other aspects of the user interface of the cellular telephone.)

Figure 7:
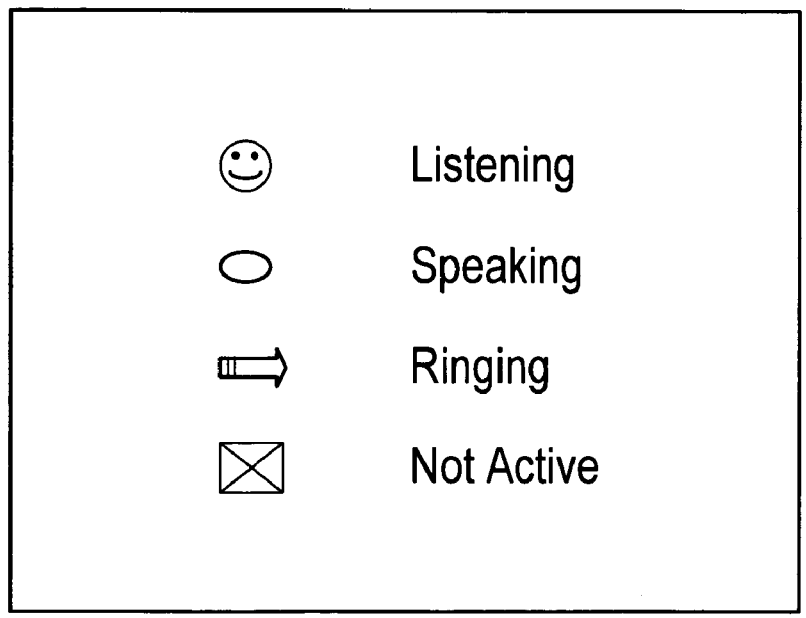
FIG. 7 is an example key illustration of status icons that may be included in the screen display of FIG. 6.

It will also be noted from FIG. 6, that the member list includes a respective icon 112 associated with each name of the member list to indicate the current status of the respective member with respect to the current group call session. The icons may carry meanings such as "listening", "talking", "ringing" and "not active", as illustrated by the key presented in FIG. 7. In some embodiments, the key of FIG. 7 may be presented to the user at a suitable time, such as during a training mode of the cellular telephone.

With reference again to FIG. 3, following 110 a decision 114 is made as to whether the user has selected an option to go back to the session display (i.e., to exit from the member list display of FIG. 6). The user may select this option by actuating the soft key which corresponds to the "Back" function label 116 shown in the member list display of FIG. 6. If it is determined at 114 that the user has selected the option to go back to the session display, then the process of FIG. 3 branches back to 86, and a session display (e.g., the display of FIG. 4 or 5) is presented. Otherwise, the process of FIG. 3 loops back to 110 and the member list continues to be displayed.

Considering again the decision at 108 in FIG. 3, if a negative determination is made at 108, then there is a decision 118 as to whether a member of the designated group is talking. If so, then a screen display such as that shown in FIG. 8 is displayed on the display component 24 (as indicated at 120 in FIG. 3).

Figure 8:
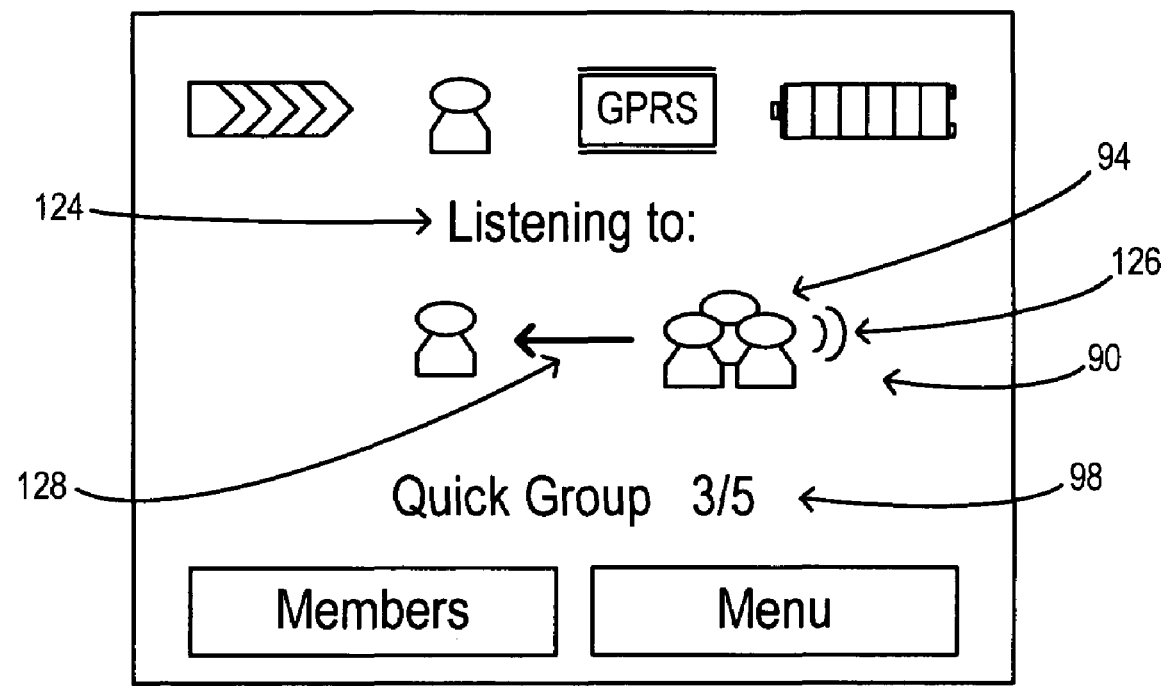
FIG. 8 is an example screen display provided by the cellular telephone of FIGS. 1 and 2 in accordance with some aspects of the invention.

Referring to FIG. 8, it will be noted that the screen display shown therein is a variant of the session displays shown in FIGS. 4 and 5. Comparing the screen display of FIG. 8 with that of FIG. 4, it will be noted that the screen display of FIG. 8 includes at 122 the name of the group member who is currently talking (transmitting) in the group call session. Also, the "Ready" legend 96 of FIG. 4 is replaced by the legend 124 in FIG. 8 that reads "listening to". In addition, the group of icons 90, as presented in the screen display of FIG. 8, includes icons 126, 128, and has one icon highlighted from the cluster 94 of figure icons, all to indicate that a member of the designated group is currently transmitting and the cellular telephone 20 is receiving the transmission.

It will be noted that the screen display of FIG. 8 includes the same indication 98 as the screen display of FIG. 4.

Referring once more to FIG. 3, if a negative determination is made at 118, the process of FIG. 3 loops back to 86, and one of the displays of FIGS. 4 or 5 may be displayed, for example.

Although not indicated in FIG. 3, it will be appreciated that the process illustrated therein may have a capability for breaking out of the process loop to another function of the cellular telephone at a time when the group call session ends. The end of the group call session may occur, for example, when the user presses an "end" key on the cellular telephone 20.

With the user interface described above, the cellular telephone may provide various kinds of cues and information to the user concerning the group call session to aid the user in understanding what is happening during the group call session.

This may make the group calling PoC function of the cellular telephone more "user-friendly".

Although the cellular telephone has been described in detail in the foregoing embodiments, it is to be understood that the descriptions have been provided for purposes of illustration only and that other variations both in form and detail can be made thereupon by those skilled in the art without departing from the spirit and scope of the invention, which is defined solely by the appended claims.

What is claimed is:

1. A method of operating a cellular telephone, the cellular telephone being operated by a first user and including a display, and being selectively operable in a mode in which a group call is supported among more than two parties according to a push-to-talk-over-cellular (PoC) procedure, the cellular telephone including a designation of a group of cellular telephone users other than the first user, the method comprising:
   entering into a group call session in accordance with said PoC procedure, the designated group being selected for the group call session; and
   displaying on the display information that indicates how many members of the designated group are in an active status relative to the group call session;
   wherein the displaying includes displaying a first numeral that indicates how many members of the designated group are in an active status relative to the group call session, followed in space on the display by a symbol, followed in space on the display by a second numeral that indicates how many members are included in the designated group.

2. A method according to claim 1, wherein said symbol is "/".

3. A method according to claim 1, further comprising:
   displaying, simultaneously with said first and second numerals, a plurality of icons which includes at least one icon representing the first user, at least one other icon representing the designated group, and at least one further icon to indicate the first user is transmitting or a member of the designated group is transmitting.

4. A method according to claim 1, wherein the group is designated by selecting an identifier of the group.

5. A method according to claim 1, wherein the group is designated by selecting a respective identifier for each member of the group.

6. A cellular telephone, comprising:
   a processor;
   communication means, operatively coupled to the processor, for receiving and transmitting information;
   a display component operatively coupled to the processor; and
   a memory operatively coupled to the processor and storing software adapted to control the processor to:
      store in the memory a designation of a group of users of other cellular telephones;
      place the cellular telephone in a mode in which a group call is supported among more than two parties according to a push-to-talk-over-cellular (PoC) procedure;
      enter into a group call session in accordance with said PoC procedure, the designated group being selected for the group call session; and
      display on the display component information that indicates how many members of the designated group are in an active status relative to the group call session;
   wherein the display component displays a first numeral that indicates how many members of the designated group are in an active status relative to the group call session, followed in space on the display component by a symbol, followed in space on the display component by a second numeral that indicates how many members are included in the designated group.

7. A cellular telephone according to claim 6, wherein the symbol is "/".

8. The cellular telephone according to claim 6, wherein the display component displays, simultaneously with said first and second numerals, a plurality of icons which includes at least one icon representing a user of the cellular telephone, at least one other icon representing the designated group, and at least one further icon to indicate the user of the cellular telephone is transmitting or a member of the designated group is transmitting.

9. A cellular telephone according to claim 6, wherein the group is designated by selecting an identifier of the group.

10. A cellular telephone according to claim 6, wherein the group is designated by selecting a respective identifier for each member of the group.

* * * * *